US011223398B2

United States Patent
Cao

(10) Patent No.: US 11,223,398 B2
(45) Date of Patent: Jan. 11, 2022

(54) ELECTRONIC APPARATUS, WIRELESS COMMUNICATION METHOD AND COMPUTER-READABLE MEDIUM

(71) Applicant: Sony Corporation, Tokyo (JP)

(72) Inventor: Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 34 days.

(21) Appl. No.: 16/644,498

(22) PCT Filed: Dec. 11, 2018

(86) PCT No.: PCT/CN2018/120220
§ 371 (c)(1),
(2) Date: Mar. 5, 2020

(87) PCT Pub. No.: WO2019/114681
PCT Pub. Date: Jun. 20, 2019

(65) Prior Publication Data
US 2021/0091831 A1    Mar. 25, 2021

(30) Foreign Application Priority Data

Dec. 15, 2017 (CN) .......................... 201711350643.9

(51) Int. Cl.
*H04B 7/0456* (2017.01)
*H04W 72/04* (2009.01)

(52) U.S. Cl.
CPC ........ *H04B 7/0456* (2013.01); *H04W 72/046* (2013.01)

(58) Field of Classification Search
CPC ........... H04W 72/0466; H04W 72/042; H04W 72/0413; H04J 13/0003
(Continued)

(56) References Cited

U.S. PATENT DOCUMENTS

2010/0146141 A1\* 6/2010 Lim ...................... H04L 1/0041
709/231
2012/0088458 A1\* 4/2012 Nogami ............... H04B 7/0645
455/67.11
(Continued)

FOREIGN PATENT DOCUMENTS

| CN | 101741517 A | 6/2010 |
| CN | 102035580 A | 4/2011 |
| CN | 108632192 A | 10/2018 |

OTHER PUBLICATIONS

International Search Report and Written Opinion dated Feb. 27, 2019 for PCT/CN2018/120220 filed on Dec. 11, 2018, 9 pages including English Translation of the International Search Report.
(Continued)

*Primary Examiner* — Shuwang Liu
*Assistant Examiner* — Gina M McKie
(74) *Attorney, Agent, or Firm* — Xsensus LLP

(57) ABSTRACT

The present disclosure relates to an electronic apparatus, a wireless communication method, and a computer-readable medium. According to one embodiment, an electronic apparatus used at a base station side comprises a processing circuit. The processing circuit is configured to carry out control so as to carry out multiple-input multiple-output transmission by means of two or more transmitting and receiving points, and to send indication information to a user equipment, wherein the indication information is related to a scheme of mapping between a spatial multiplexing layer and a code word for transmission by means of two or more transmitting and receiving points.

3 Claims, 15 Drawing Sheets

(58) Field of Classification Search
USPC .......................................................... 370/335
See application file for complete search history.

(56) References Cited

U.S. PATENT DOCUMENTS

2016/0365993 A1\* 12/2016 Chen ................. H04L 25/03904
2017/0202014 A1\* 7/2017 Moon ..................... H04L 5/005

OTHER PUBLICATIONS

Nokia and Alcatel-Lucent Shanghai Bell, "On the number of codewords in NR," 3GPP TSG-RAN WG1#88 bis, R1-1705952, Spokane, WA, USA, Apr. 3-7, 2017, 7 pages.
ZTE et al., "Way Forward on number of CWs for NR," 3GPP TSG RAN WG1 NR Ad-Hoc Meeting, R1-1701279, Spokane, USA, Jan. 16-20, 2017, 3 pages.

\* cited by examiner

ELECTRONIC APPARATUS, WIRELESS COMMUNICATION METHOD AND COMPUTER-READABLE MEDIUM

CROSS-REFERENCE TO RELATED APPLICATIONS

The present application is based on PCT filing PCT/CN2018/120220, filed Dec. 11, 2018, which claims priority to CN 201711350643.9, filed Dec. 15, 2017, the entire contents of each are incorporated herein by reference.

FIELD OF THE INVENTION

The present disclosure generally relates to the field of wireless communication, and in particular to an electronic apparatus and a wireless communication method for base station side, an electronic apparatus and a wireless communication method for user equipment side, as well as a computer readable medium.

BACKGROUND OF THE INVENTION

In Multi-Input Multi-Output (MIMO) technology, taking precoding of a downlink transmission as an example, modulation symbols corresponding to a transport block (TB) are first mapped to multiple spatial multiplexing layers (which may be referred to as layers herein). Transport blocks have a one-to-one correspondence with code words (CW). A code word is an independent transport block sent at a transmission time interval (TTI), where the independent transport block includes a cyclic redundancy check (CRC) bit and is subjected to encoding and rate matching. Generally, a code word is a transport block having a CRC (the code word and the transport block may be interchanged herein).

Mapping from code words to layers indicates mapping one or two code words to multiple parallel spatial multiplexing layers for transmission, so that spatial multiplexing transmission is performed on a user equipment (UE). A data flow 1 and a data flow 2 shown in FIG. 9 may be understood as corresponding to two layers. A base station sends the data flow 1 and the data flow 2 to the UE on the same time-frequency resource through a group of physical antennas, and then the UE restores the data flow 1 and the data flow 2 through, for example, a receiver and a digital signal processor (DSP). FIG. 10 is a schematic diagram showing an example in which modulation symbols of a code word are mapped to multiple layers (four layers in this example as shown). In the example as shown, the modulation symbols of a code word CW0 are mapped to a layer 0, a layer 1, a layer 2 and a layer 3, respectively.

In existing new radio (NR) systems, there is a fixed mapping relationship between code words and spatial multiplexing layers.

SUMMARY OF THE INVENTION

A brief summary of embodiments of the present invention is given in the following, so as to provide basic understanding on some aspects of the present invention. It should be understood that, the summary is not an exhaustive summary of the present invention. The summary is neither intended to determine key or important parts of the present invention, nor intended to limit the scope of the present invention. An object of the summary is to provide some concepts in a simplified form, as a preamble of a detailed description discussed later.

According to an embodiment, there is provided an electronic apparatus for base station side, including a processing circuitry. The processing circuitry is configured to perform control to: perform a Multi-Input Multi-Output transmission through two or more transmission/reception points (TRP, Tx/Rx Point); and send indication information to a user equipment. The indication information is related to a mapping scheme between spatial multiplexing layers and code words transmitted through the two or more transmission/reception points.

According to another embodiment, there is provided a wireless communication method for base station side, including: a step of performing a Multi-Input Multi-Output transmission through two or more transmission/reception points; and a step of sending indication information to a user equipment. The indication information is related to a mapping scheme between spatial multiplexing layers and code words transmitted through the two or more transmission/reception points.

According to another embodiment, there is provided an electronic apparatus for a user equipment, including a processing circuitry. The processing circuitry is configured to perform control to: receive a Multi-Input Multi-Output transmission performed by a base station through two or more transmission/reception points; and receive indication information from the base station. The indication information is related to a mapping scheme between spatial multiplexing layers and code words transmitted through the two or more transmission/reception points.

According to another embodiment, there is provided a wireless communication method for a user equipment, including: a step of receiving a Multi-Input Multi-Output transmission performed by a base station through two or more transmission/reception points; and a step of receiving indication information from the base station. The indication information is related to a mapping scheme between spatial multiplexing layers and code words transmitted through the two or more transmission/reception points.

According to another embodiment, there is provided an electronic apparatus for base station side, including a processing circuitry. The processing circuitry is configured to perform control to: perform a Multi-Input Multi-Output transmission through two or more transmission/reception points; and receive indication information from a user equipment. The indication information is related to a mapping scheme between spatial multiplexing layers and code words transmitted through the two or more transmission/reception points.

According to another embodiment, there is provided a wireless communication method for base station side, including: a step of performing a Multi-Input Multi-Output transmission through two or more transmission/reception points; and a step of receiving indication information from a user equipment. The indication information is related to a mapping scheme between spatial multiplexing layers and code words transmitted through the two or more transmission/reception points.

According to another embodiment, there is provided an electronic apparatus for user equipment side, including a processing circuitry. The processing circuitry is configured to: perform control to receive a Multi-Input Multi-Output transmission performed by a base station through two or more transmission/reception points; determine, based on a downlink channel state of the Multi-Input Multi-Output transmission, a mapping scheme between spatial multiplexing layers and code words transmitted through the two or more transmission/reception points; and perform control to send indication information related to the mapping scheme to the base station.

According to another embodiment, there is provided a wireless communication method for user equipment side, including: a step of receiving a Multi-Input Multi-Output transmission performed by a base station through two or more transmission/reception points; a step of determining, based on a downlink channel state of the Multi-Input Multi-Output transmission, a mapping scheme between spatial multiplexing layers and code words transmitted through the two or more transmission/reception points; and a step of sending indication information related to the mapping scheme to the base station.

A computer readable medium is further provided according to an embodiment of the present invention. The computer readable medium includes executable instructions which, when being executed by an information processing device, cause the information processing device to implement the methods according to the above embodiments.

A relatively flexible mapping from code words to layers can be achieved by means of the embodiments of the present invention.

BRIEF DESCRIPTION OF THE DRAWINGS

The present invention can be understood better with reference to the detailed description given in conjunction with the drawings. Throughout the drawings, the same or similar components are indicated by the same or similar reference numerals. The drawings together with the following detailed description are included in the specification and form a part of the specification, and are used to further illustrate preferred embodiments of the present invention by examples and explain principles and advantages of the present invention.

In the drawings.

DETAILED DESCRIPTION OF EMBODIMENTS

Figure 1:
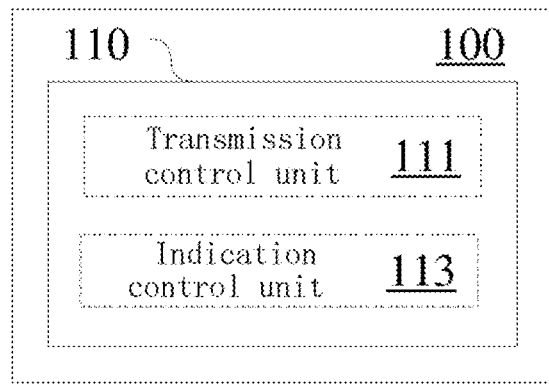
FIG. 1 is a block diagram showing a configuration example of an electronic apparatus for base station side according to an embodiment of the present invention.

Embodiments of the present invention are described below with reference to the drawings. Elements and features described in one of the drawings or one embodiment of the present invention may be combined with elements and features described in one or more other drawings or embodiments. It should be noted that representations and descriptions of components and processing which are irrelevant to the present invention and known by those skilled in the art are omitted in the drawings and the specification for clarity.

As shown in FIG. 1, an electronic apparatus 100 for user equipment side according to the present embodiment includes a processing circuitry 110. The processing circuitry 110 may be implemented as, for example, a specific chip, a chipset, or a central processing unit (CPU), and so on.

The processing circuitry 110 includes a transmission control unit 111 and an indication control unit 113. It should be noted that although the transmission control unit 111 and the indication control unit 113 are shown in a form of functional blocks in the drawings, it should be understood that functions of these units may also be implemented by the processing circuitry 110 as a whole, but unnecessarily implemented by discrete, actual components in the processing circuitry 110. In addition, although the processing circuitry 110 is shown as one block in the drawings, the electronic apparatus 100 may include multiple processing circuitries. Further, functions of the transmission control unit 111 and the indication control unit 113 may be distributed among the multiple processing circuitries, so that these functions are implemented by the multiple processing circuitries in cooperation with each other.

The transmission control unit 111 is configured to perform control to perform a Multi-Input Multi-Output transmission through two or more transmission/reception points.

Figure 20:
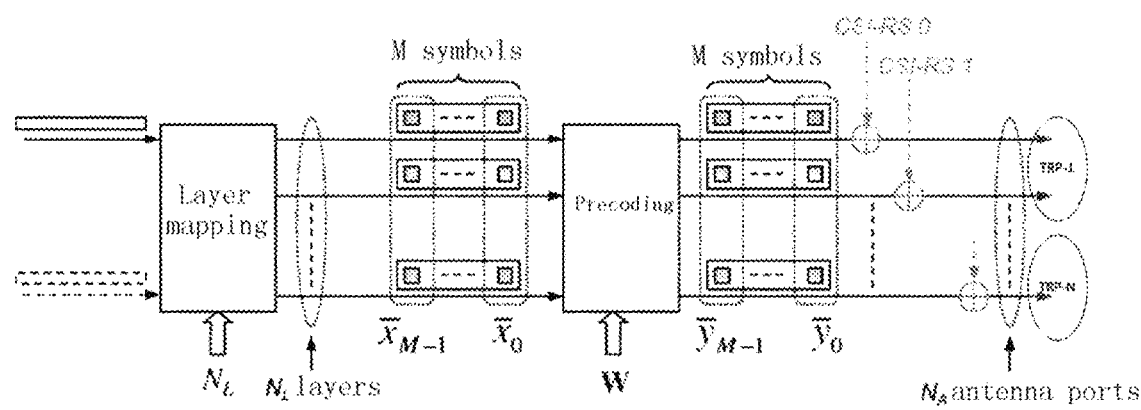
FIG. 20 shows an example of a structure of a codebook-based antenna precoding.

Next, the Multi-Input Multi-Output transmission is briefly described first with reference to FIG. 20.

As shown in FIG. 20, modulation symbols corresponding to one or two transport blocks are first mapped to $N_L$ layers. The number of layers may range from a minimum value of 1 to a maximum value equal to the number of antenna ports. In an exemplary embodiment of the present invention, the maximum value of the number of layers is 8.

A codebook-based precoding depends on a reference signal such as a CSI-RS (channel state indication reference signal) estimated by a downlink channel, and is used by a UE to measure the downlink channel so as to recommend a precoding matrix for downlink transmission. The CSI-RS shown in FIG. 20 is only illustrative, but it does not mean that it is inserted specifically for PDSCH transmission.

In an example of non-codebook precoding, a demodulation reference signal is inserted into a PDSCH before precoding, so that the UE estimates, based on the demodulation reference signal, a channel including the precoding through which a data transmission layer actually passes, thereby performing direct coherent-demodulation among different layers. The UE only need to acquire the number of layers, that is, a rank for transmission, without acquiring any information about the precoding matrix. A network may arbitrarily select the precoding without any explicit codebook for selection. However, it should be noted that, the non-codebook precoding may still rely on a predefined codebook fed back by the UE, for example, a precoding matrix indicated by a PMI (precoding matrix indication), as a reference, and the predefined codebook is not necessarily used for actual downlink transmission.

In addition, it should be noted that the two or more transmission/reception points may include two or more antenna plates performing non-coherent transmission in a same transmission/reception point apparatus as well. In other words, the multiple transmission/reception points described herein indicate a relatively generalized concept, and may refer to either multiple TRPs separated from each other or multiple antenna plates included in one TRP.

Figure 14:
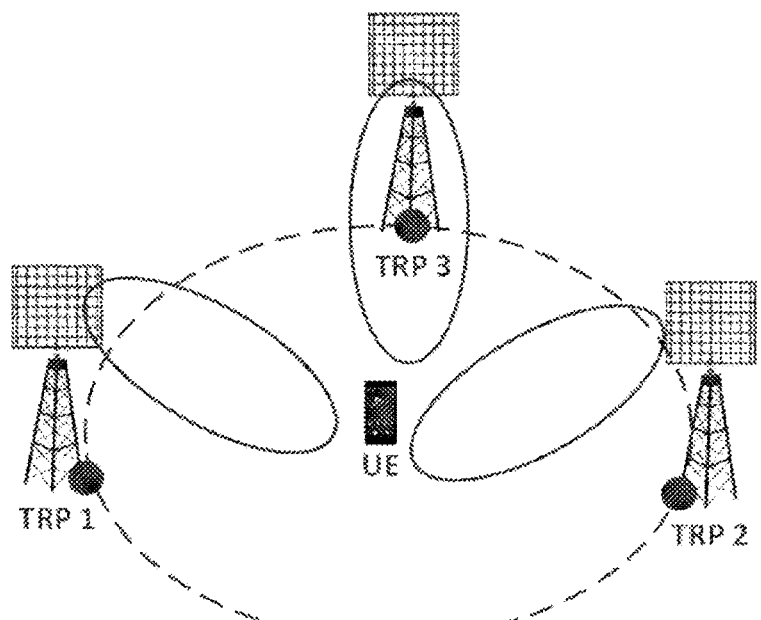
FIG. 14 shows an exemplary scenario where multiple TRPs serve one UE.

Specifically, the multiple transmission/reception points may represent the multiple TRPs that are spatially separated from each other. The multiple TRPs may form a cell and share a Cell ID. For example, as shown in FIG. 14, three TRPs in one cell serve one UE. The three TRPs may be connected together at a high speed through an optical fiber or the like to share information. Alternatively, one TRP may form one cell independently. That is, each TRP has its own Cell ID.

Figure 15:
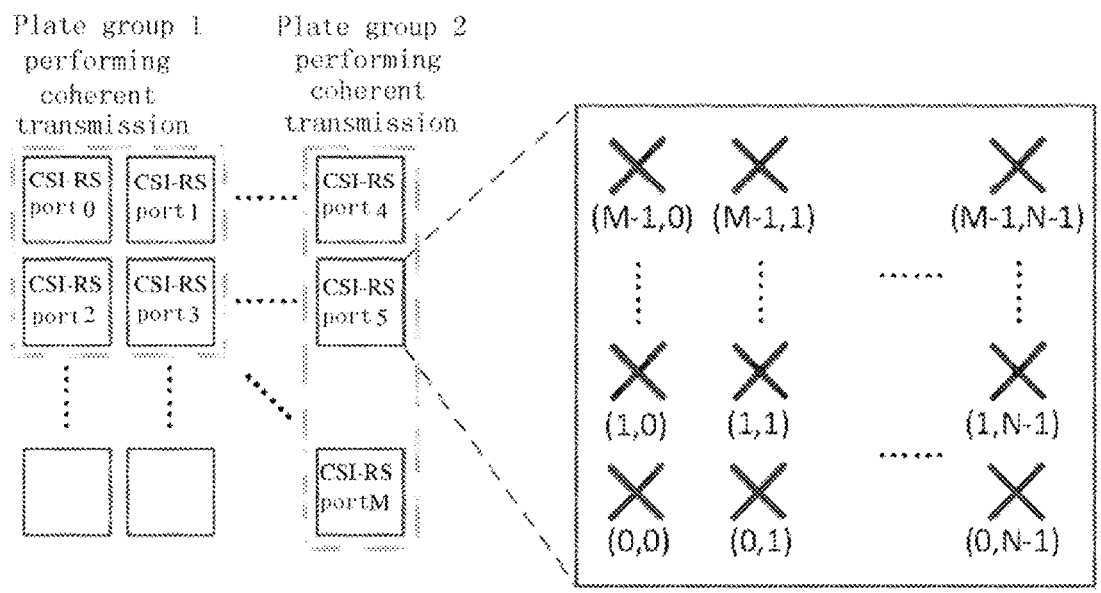
FIG. 15 is a schematic diagram showing an example of antenna plates performing non-coherent transmission in a base station.
Figure 18:
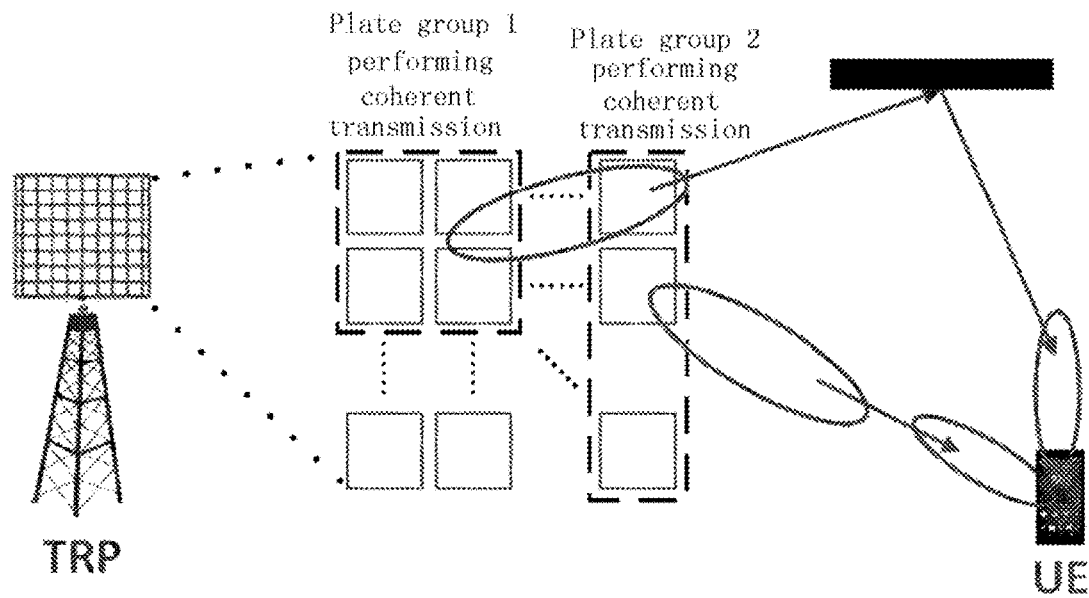
FIG. 18 is a schematic diagram for explaining an example of transmission beams from different antenna plates to a UE.

For two or more antenna plates performing non-coherent transmission, as shown in FIG. 15, in antenna plate groups 1 and 2 for coherent transmission, sufficient calibration as well as frequency and phase synchronization process have been performed among the antenna plates in a hardware level, and coherent transmission and reception can be performed. The "coherent" described herein indicates that signals transmitted by the antenna plates are correlated with each other. For example, phases and amplitudes of antenna ports are adjusted by using one PMI. However, the above assumption cannot be used between the groups 1 and 2, and thus only non-coherent transmission can be performed between the groups 1 and 2. The "non-coherent" described herein indicates that signals transmitted by the antenna plates may be uncorrelated. In addition, as shown in FIG. 18, in one TRP, different transmission beams may be used from different antenna plates to a same UE, resulting in significant difference between transmission paths of wireless signals from multiple antenna plates to the UE, which actually is similar to a case that transmission paths from multiple physically separated TRPs to the UE are different.

In this case, the two or more transmission/reception points may refer to two or more antenna plates performing non-coherent transmission in a same transmission/reception point apparatus. According to an example, one transmission/reception point may correspond to one antenna plate.

Next, the electronic apparatus according to the present embodiment is further described with reference to FIG. 1.

The indication control unit 113 is configured to perform control to send indication information to a user equipment. The indication information is related to a mapping scheme between spatial multiplexing layers and code words transmitted through the two or more transmission/reception points.

Figure 21:
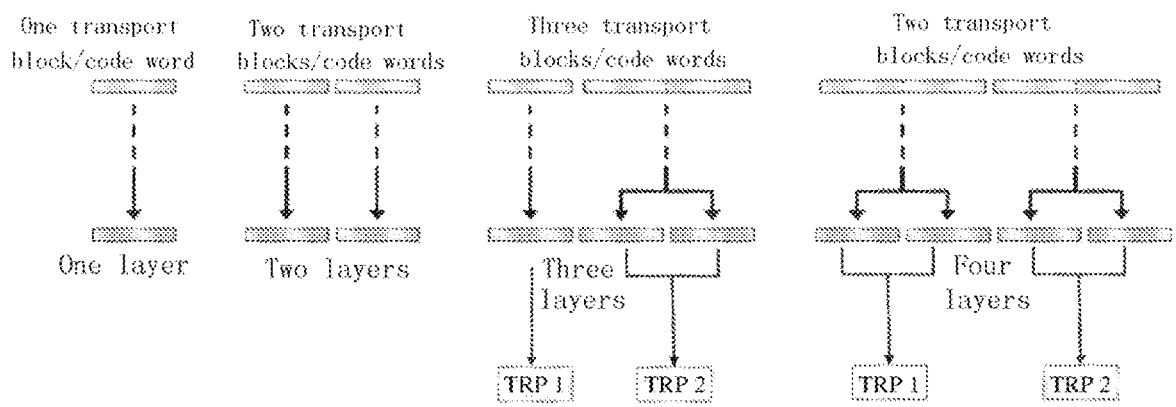
FIG. 21 is a schematic diagram for explaining a mapping from code words to layers.

Mapping from code words to layers is described below with reference to FIG. 21. For mapping from transport blocks to layers, the numbers of modulation symbols on respective layers are required to be equal to each other, that is, the number of modulation symbols on each layer is equal to the number of symbols transmitted through each antenna port. Therefore, in the case of 3 layers, a second transport block would be mapped to a second layer and a third layer with twice a length of a first code book (which is mapped to a first layer), which is guaranteed by a set of supportable transport block sizes that combines a code block segmentation function and a rate matching function, and so on for other numbers of layers. In the example that one transport block is mapped to two layers, the modulation symbols on this transport block are mapped to the two layers in an interactive mode. In other words, for two adjacent modulation symbols, one modulation symbol is mapped to the first layer, and the other modulation symbol is mapped to the second layer, and so on for a case that one transport block is mapped to more than two layers.

Different from the conventional technology in which only one TRP/antenna plate is included, there are multiple TRPs or multiple antenna plates in the embodiments of the present disclosure. It is considered by the inventors that a correspondence between layers and the TRPs/antenna plates may affect a mapping relationship between transport blocks/code words and the layers. The correspondence between the layers and the TRPs/antenna plates may be determined through antenna ports having a QCL (Quasi-Co-Location) relationship. Specifically, the base station configures a group of physical resources for each TRP/antenna plate for carrying reference signals, for example, CSI-RS (these CSI-RS ports have a QCL relationship) on multiple antenna ports corresponding to the TRP/antenna plate, and notifies the UE of the physical resource configuration. The UE acquires a downlink channel state including the number of layers and CQI (channel quality indicator) from a specific TRP/antenna plate to the UE by measuring the CSI-RS on these physical resources. In the example shown in FIG. 15, a group of CSI-RS ports 0, 1, 2 and 3 have a QCL relationship, and another group of CSI-RS ports 4, 5 to M have a QCL relationship. However, the UE cannot regard that any two CSI-RS ports respectively from the two groups have a QCL relationship by default.

Figure 22:
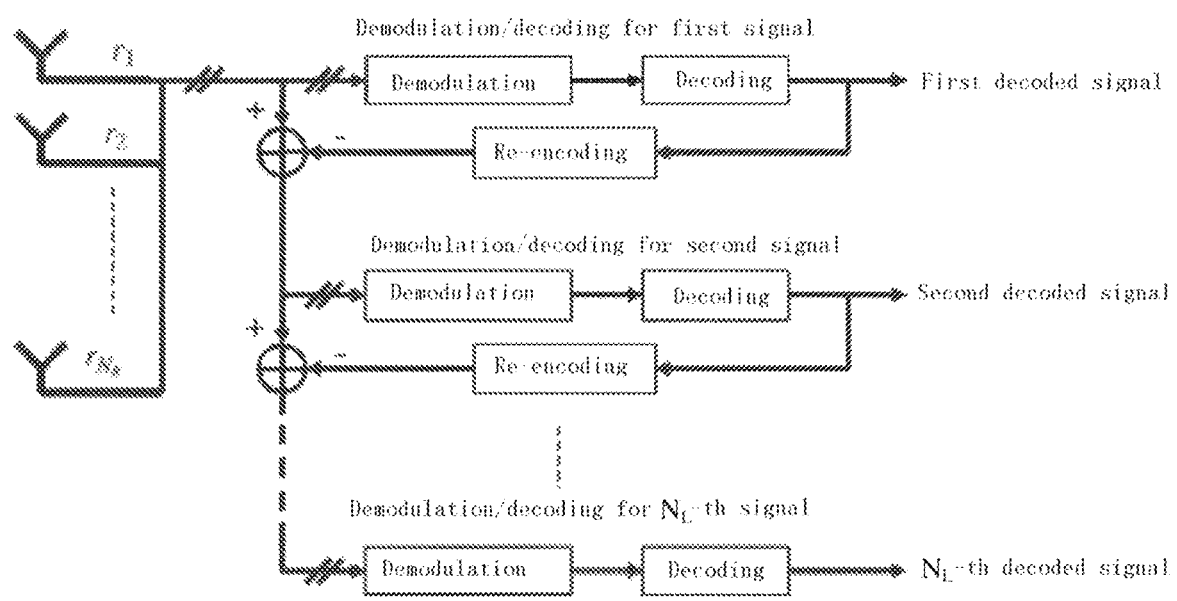
FIG. 22 is a schematic diagram of demodulation and decoding for a spatial multiplexing signal based on serial interference cancellation.

In a case that the base station has multiple TRPs and configures multiple groups of CSI-RS ports having a QCL relationship (ports in a same group have a QCL relationship, and ports in different groups do not have a QCL relationship), the UE arranges these measured layers in a group order and determines, for each of the layers, which TRP/antenna plate of the multiple TRPs/antenna plates is corresponding to the layer. Further, the UE reports a measurement result of the multiple groups of CSI-RS ports having a QCL relationship to the base station, thereby the base station determines the correspondence between the multiple layers of the downlink channel and TRPs/antenna plates, so as to adjust the mapping from transport blocks/code words to the layers. In some examples, the base station maps only one transport block/code word to multiple layers belonging to one TRP/antenna plate. In which, a modulation and coding scheme and the like used for the transport block/code word is determined based on a SINR (signal to interference plus noise ratio), for example, the CQI, of these layers, and the modulation and coding scheme and the like is carried in downlink resource scheduling information to notify the UE. Correspondingly, the UE acquires which layers are corresponding to a same TRP/antenna plate, and further acquires the layers on which the same code word is transmitted, and performs corresponding demodulation/decoding. For example, a non-linear receiver is provided at the UE side, the signals of layers are decoded based on a serial interference cancellation manner, and finally content of each code word is restored based on the correspondence between the layers and the code words according to the present disclosure, as shown in FIG. 22.

The number of layers is usually referred to as a transmission rank (order) as well. The transmission rank may change dynamically, for example, based on the number of layers supported by a channel. The number of layers supported by the channel is a rank of the channel.

Reference is still made to FIG. 20, after the transmission layer is mapped, a set with $N_L$ symbols (one symbol from one layer) is linearly merged and is mapped to an antenna port. The merging and mapping may be completed based on a $N_A * N_L$ precoding matrix W, where $N_A$ represents the number of antenna ports. After the precoding, a vector $y_i$ with a size of $N_A$ is obtained from $\bar{y}_i = W * \bar{x}_i$. The vector $\bar{y}_i$ includes symbols on respective antenna ports. The vector $\bar{x}_i$ has a size of $N_L$, and includes the symbols from respective layers. The number of layers may change dynamically, so that the number of columns of the precoding matrix also changes dynamically.

According to an embodiment, the indication control unit 113 may be configured to perform control to send the indication information through at least one of radio resource control (RRC) signaling, media access control-control element (MAC-CE) signaling, physical layer dynamic signaling, and a broadcast message.

Specifically, the physical layer dynamic signaling may include downlink control information (DCI). In addition, the broadcast message may include a system notification sent through a physical broadcast channel.

In addition, according to an embodiment, the mapping scheme is selected from a first scheme and a second scheme as follows.

In the first scheme, there is a predetermined mapping manner between the spatial multiplexing layers and the code words.

In the second scheme, mapping between the spatial multiplexing layers and the code words is determined based on a transmission/reception point or based on a downlink channel state.

Next, the case that there is a predetermined mapping manner between the spatial multiplexing layers and the code words is described first.

The predetermined mapping manner between the spatial multiplexing layers and the code words may include a fixed mapping relationship used in an existing NR system. Specifically, a mapping from the modulation symbols of each code word to the layers is determined based on Table 1 below, where modulation symbols $d^{(q)}(0), \ldots, d^{(q)}(M_{symb}^{(q)}-1)$ of a code word q are mapped to layers $x(i) = [x^{(0)}(i) \ldots x^{(\upsilon-1)}(i)]^T$, $i=0, 1, \ldots, M_{symb}^{layer}-1$, $\upsilon$ represents the number of layers, and $M_{symb}^{layer}$ represents the number of modulation symbols of each layer.

TABLE 1

| Number of layers | Number of code words | Mapping from code words to layers i = 0, 1, . . . , $M_{symb}^{layer}$ − 1 | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$ | $M_{symb}^{layer} = M_{symb}^{(0)}/3 = M_{symb}^{(1)}/4$ |

TABLE 1-continued

| Number of layers | Number of code words | Mapping from code words to layers $i = 0, 1, \ldots, M_{symb}^{layer} - 1$ | |
|---|---|---|---|
| 8 | 2 | $x^{(5)}(i) = d^{(1)}(4i + 2)$ <br> $x^{(6)}(i) = d^{(1)}(4i + 3)$ <br> $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ <br> $x^{(4)}(i) = d^{(1)}(4i)$ <br> $x^{(5)}(i) = d^{(1)}(4i + 1)$ <br> $x^{(6)}(i) = d^{(1)}(4i + 2)$ <br> $x^{(7)}(i) = d^{(1)}(4i + 3)$ | $M_{symb}^{layer} = M_{symb}^{(0)}/4 = M_{symb}^{(1)}/4$ |

Besides the above mapping manner, any of mapping schemes included in Table 2 below may also be used. The number of layers L ranges from 2 to 8. The value of the number of schemes M corresponding to each number of layers depends on the number of layers L (M≤L−1). L0 represents the number of layers to which the first code word is mapped, and L1 represents the number of layers to which the second code word is mapped.

TABLE 2

| L | | Possible combinations of $(L_0, L_1)$ |
|---|---|---|
| 2 | M = 1 | (1, 1) |
| 3 | M = 2 | Scheme 1: (1, 2), Scheme 2: (2, 1) |
| 4 | M = 3 | Scheme 1: (1, 3), Scheme 2: (2, 2), Scheme 3: (3, 1) |
| 5 | M = 4 | Scheme 1: (1, 4), Scheme 2: (2, 3), Scheme 3: (3, 2), Scheme 4: (4, 1) |
| 6 | M = 5 | Scheme 1: (1, 5), Scheme 2: (2, 4), Scheme 3: (3, 3), Scheme 4: (4, 2), Scheme 5: (5, 1) |
| 7 | M = 6 | Scheme 1: (1, 6), Scheme 2: (2, 5), Scheme 3: (3, 4), Scheme 4: (4, 3), Scheme 5: (5, 2), Scheme 6: (6, 1) |
| 8 | M = 7 | Scheme 1: (1, 7), Scheme 2: (2, 6), Scheme 3: (3, 5), Scheme 4: (4, 4), Scheme 5: (5, 3), Scheme 6: (6, 2), Scheme 7: (7, 1) |

In the scheme that there is a predetermined mapping manner between the spatial multiplexing layers and the code words, a mapping table from code words to layers may be stored by the base station, or the mapping table from code words to layers may be predefined. The base station may, for example, determine which mapping relationship from code words to layers is to be used in PDSCH transmission based on a rank index (RI) fed back by the UE. In addition, the base station may notify, for example, through the MAC CE or the DCI, the UE of a mapping scheme from code words to layers that is selected by the PDSCH.

On the other hand, the mapping scheme between the spatial multiplexing layers and the code words may be determined based on the transmission/reception point or based on the downlink channel state. Specifically, for example, the mapping scheme between the spatial multiplexing layers and the code words may be determined based on transmission/reception points at a base station side. Alternatively, for example, the mapping scheme between the spatial multiplexing layers and the code words may be determined based on the downlink channel state at the UE side.

According to an embodiment, the mapping scheme may be determined as a mapping scheme in which spatial multiplexing layers transmitted through a same transmission/reception point correspond to a same code word.

Next, an example that the mapping scheme between the spatial multiplexing layers and the code words is determined based on the transmission/reception point is described with reference to FIG. 11.

Figure 11:
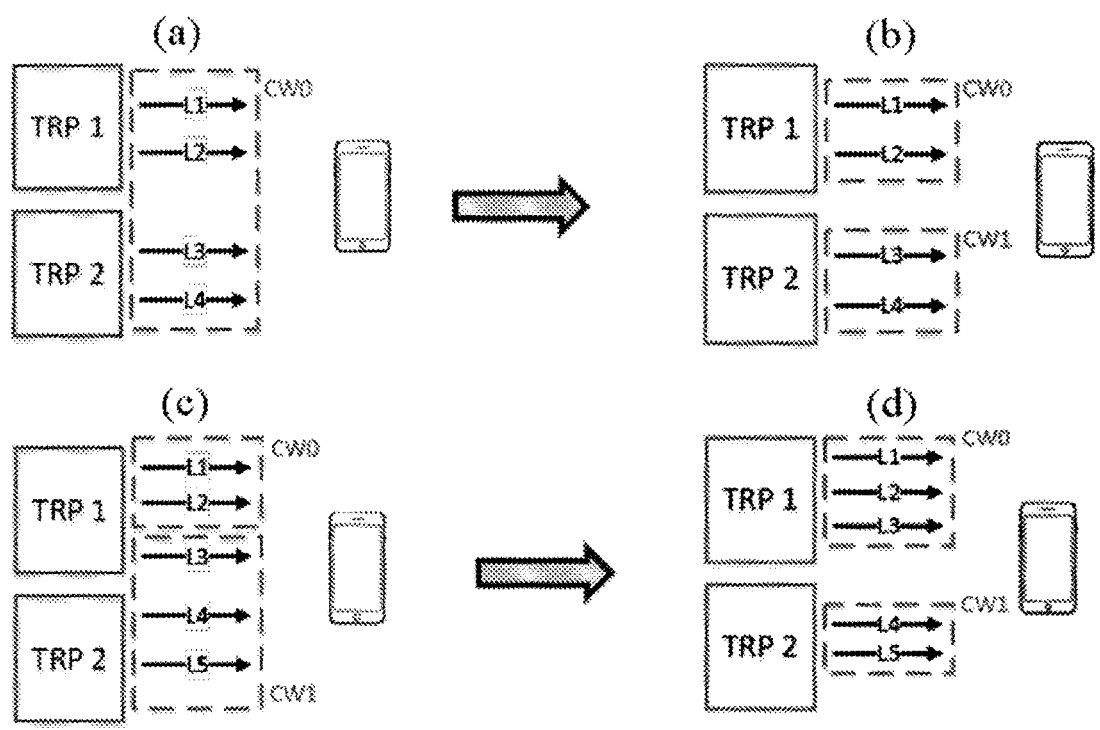
FIG. 11 is a schematic diagram for explaining an example of a mapping manner between code words and layers.

In a case shown in FIG. 11 (a), based on the fixed mapping manner in Table 1, two TRPs (namely, TRP1 and TRP2) transmit four layers, one code word CW0 (that is, one CQI) in total, for one UE. However, channel quality of a layer 1 (L1) and a layer 2 (L2) may not be similar to that of a layer 3 (L3) and a layer 4 (L4), and thus the channel quality may not be accurately obtained.

As shown in FIG. 11 (b), according to the present embodiment, the spatial multiplexing layers transmitted through a same transmission/reception point correspond to a same code word. That is, the layer 1 and the layer 2 that are transmitted through the TRP1 are mapped to CW0, and the layer 3 and the layer 4 that are transmitted through the TRP2 are mapped to CW1, such that the channel quality can be obtained more accurately.

In a case shown in FIG. 11 (c), two TRPs transmit 5 layers, 2 code words (that is, 2 CQIs) in total for one UE. Based on the fixed mapping manner in Table 1, a layer 1 (L1) and a layer 2 (L2) are mapped to a first code word CW0, and a layer 3 (L3), a layer 4 (L4), and a layer 5 (L5) are mapped to a second code word CW1. However, channel quality of the layer 3 may not be similar to that of the layers 4 and 5, and thus the channel quality may not be accurately obtained.

As shown in FIG. 11 (d), according to the present embodiment, the spatial multiplexing layers transmitted through a same transmission/reception point correspond to a same code word. That is, the layer 1, the layer 2, and the layer 3 that are transmitted through the TRP1 are mapped to the CW0, and the layer 4 and the layer 5 that are transmitted through the TRP2 are mapped to the CW1, such that the channel quality can be obtained more accurately.

In order to facilitate comparison with the fixed mapping scheme shown in Table 1, a mapping scheme according to an exemplary embodiment in the case that the TRP1 and the TRP2 each transmits two layers of data for the UE by using one code word is given in the following Table 3.

TABLE 3

| Number of layers | Number of code words | Mapping from code words to layers i = 0, 1, . . . , $M_{symb}^{layer} - 1$ | |
|---|---|---|---|
| ... | ... | ... | |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |
| ... | ... | | |

With this embodiment, a problem that it is difficult to express channel quality for multiple TRPs through a single CQI can be solved.

Next, an embodiment in which indication information related to the mapping scheme is sent to the user equipment is described with reference to specific examples.

A single PDSCH maximally supports 2 TRPs or 2 antenna plates performing non-coherent transmission. For example, 1 bit is configured for the UE through PBCH/RRC/MAC CE/DCI, to indicate the mapping scheme from the code words to the layers. In which, "0" represents that a predetermined mapping scheme from the code words to the layers is configured for the UE, and "1" represents that the mapping scheme from the code words to the layers based on the TRP/antenna plate is configured for the UE. Specifically, each TRP/antenna plate may correlate with one code word (that is, one CQI).

Multiple antenna plates performing coherent transmission may use one code word. In a phase of acquiring CSI (channel status indication), for example, multiple CSI-RS ports having a QCL relationship may be determined to use one code word, and multiple CSI-RS ports not having a QCL relationship may be determined to use 2 code words.

As an example, in a case of using a single TRP, the indication information "0" may be sent, thereby effectively reducing overhead of feedback of the UE and downlink control channel of the base station. In a case of using multiple TRPs, the indication information "1" may be sent, thereby obtaining the channel quality more accurately.

Figure 12:
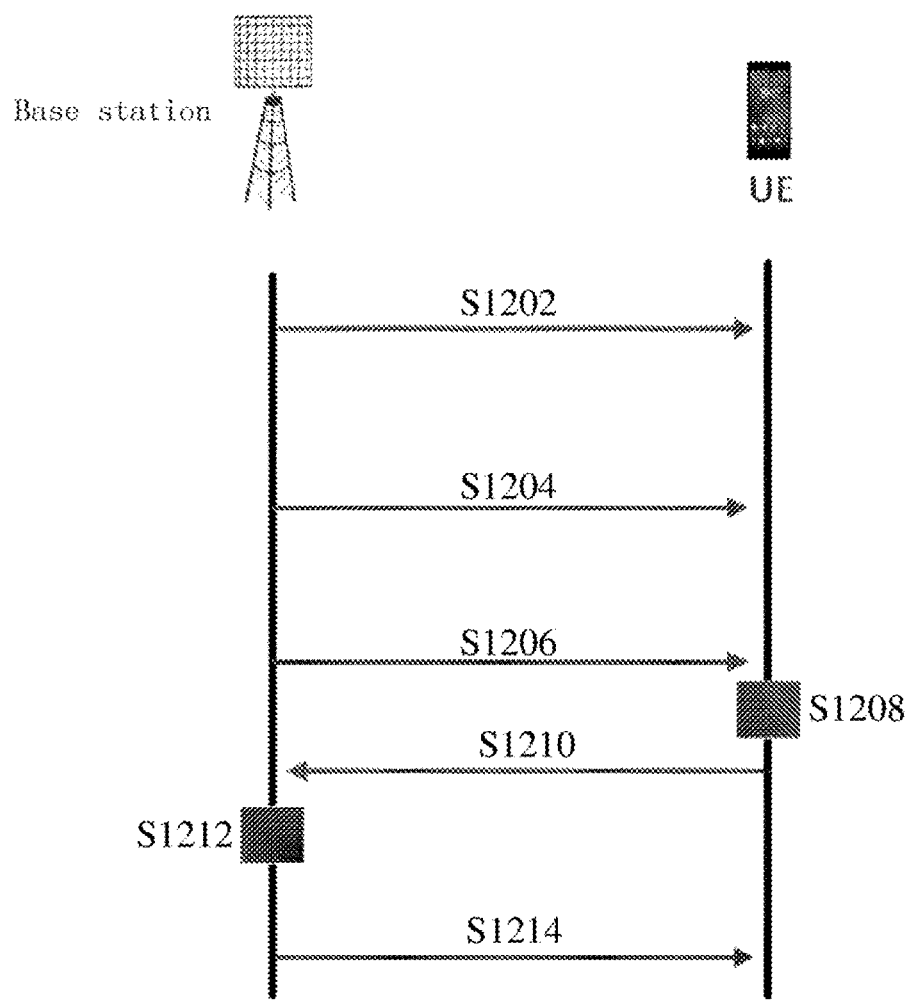
FIG. 12 is a signaling flowchart for explaining an example of interaction between a base station and a UE in an exemplary embodiment.

Next, signaling interaction between the base station and the UE is described with reference to a signaling flowchart shown in FIG. 12.

First, in S1202, the base station configures TRP information for the UE through RRC signaling. For example, a CSI-RS resource may be configured for each TRP. In this group of resources, multiple CSI-RS ports have a QCL relationship. Wireless signals sent from the base station to the UE through the multiple CSI-RS antenna ports having a QCL relationship have the same large-scale parameters satisfying channel fading (such as path loss, a transmission beam and a reception beams, etc.).

Next, in S1204, the base station sends indication information (for example, 0 or 1) to the UE through RRC/MAC CE/DCI to indicate a mapping scheme to be used.

In S1206, the base station sends the CSI-RS resource.

In S1208, the UE measures the CSI-RS resource and calculates, with respect to the indicated mapping scheme, the CSI, including PMI/RICQI.

In S1210, the UE feeds back the CSI to the base station.

In S1212, the base station performs a scheduling determination based on the reported CSI.

In S1214, the base station performs PDSCH transmission based on the mapping mode.

Figure 13:
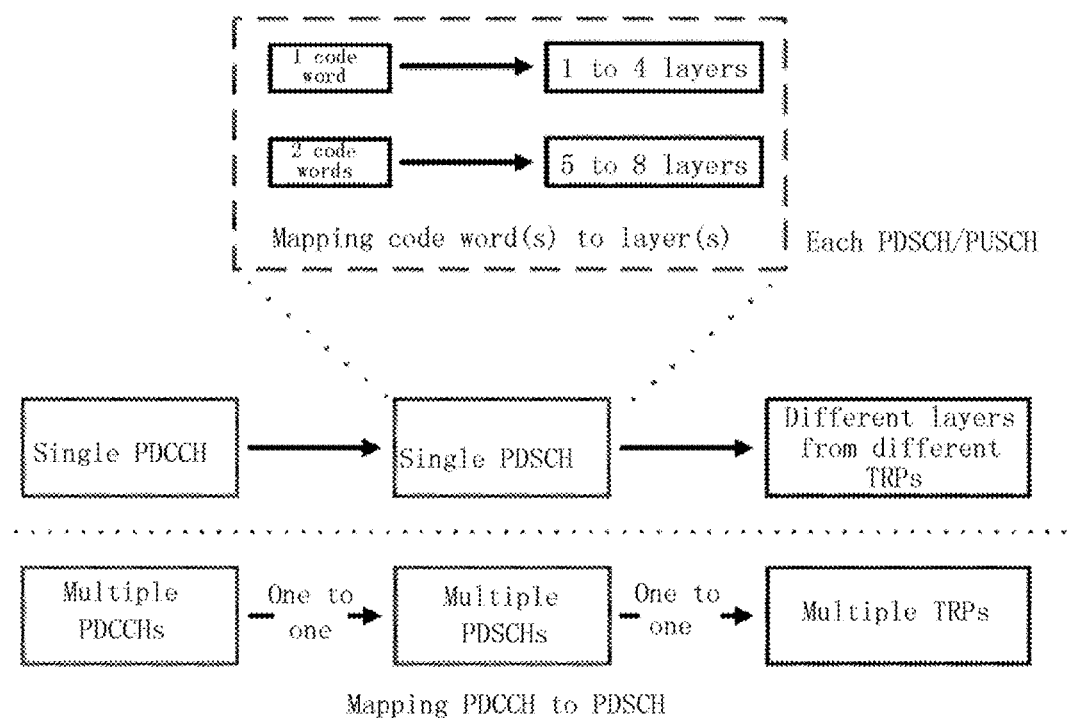
FIG. 13 is a schematic diagram of mapping from a PDCCH (physical downlink control channel) to a PDSCH (physical downlink shared channel), including a mapping relationship from one PDSCH to code words and layers.

The PDSCH is a physical layer shared data channel sent by the base station to the UE. The single PDSCH described herein is a concept relative to multiple PDSCHs. Referring to FIG. 13, multiple TRPs transmit multiple PDSCHs for the UE, and each PDSCH includes one to two CWs, corresponding to different spatial multiplexing layers. One downlink control channel, that is, the PDCCH, schedules one PDSCH. The mapping from the code words to the layers shown in FIG. 13 corresponds to the mapping scheme described above in connection with Table 1.

In addition, in consideration of a limitation of 2 TRPs or 2 antenna plates, the number of supported TRPs or antenna plates may be increased by using multiple PDSCHs.

According to an embodiment, for each of the multiple physical downlink shared channels, a mapping scheme for the physical downlink shared channel is selected from the first scheme and the second scheme as described above.

Multiple (two) PDSCHs maximally support 4 TRPs/antenna plates.

For example, indication information of 1 bit may be configured for each PDSCH of the UE through RRC/MAC CE/DCI to indicate the mapping scheme from cord words to layers.

Similar to the above exemplary embodiment, "0" may represent that a predetermined mapping scheme from the code words to the layers is configured for the UE, and "1" may represent that the mapping scheme from the code words to the layers based on the TRP/antenna plate is configured for the UE.

Specifically, each TRP/antenna plate may correlate with one code word (that is, one CQI).

It should be noted that multiple antenna plates performing coherent transmission may use one code word. In a phase of acquiring the CSI, multiple CSI-RS ports having a QCL relationship may be determined to use one code word, and multiple CSI-RS ports not having a QCL relationship may be determined to use 2 code words.

Figure 16:
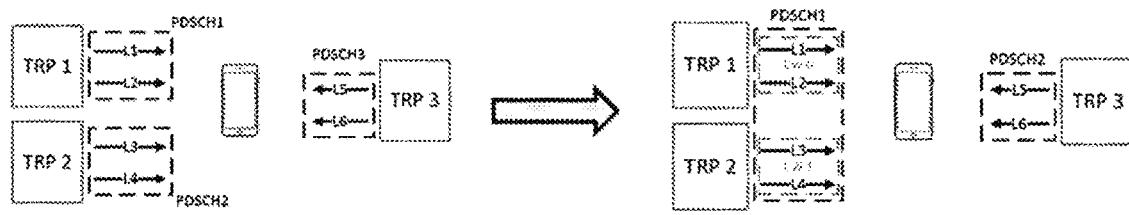
FIGS. 16 and 17 are schematic diagrams for explaining mapping relationship from code words of multiple TRPs to layers.

In addition, FIG. 16 shows a case that 3 TRPs simultaneously serve one UE. In a case that the number of layers is 6, three PDSCHs are required, as shown at a left side of FIG. 16. However, in consideration of that only two PDSCHs are supported in the existing system, two PDSCHs are used in an exemplary scheme. One of the two PDSCHs uses two code words, namely CW 0 and CW1, as shown at a right side of FIG. 16.

Figure 17:
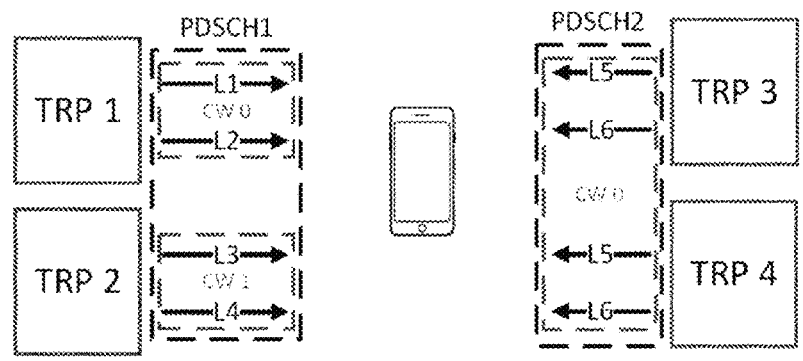

In addition, FIG. 17 shows another exemplary mapping scheme in which both a fixed mapping manner and a mapping manner based on the TRP are used.

Specifically, as shown at a left side of FIG. 17, it is assumed that channel quality of the TRP1 to the UE significantly differs from channel quality of the TRP2 to the UE. In this case, a mapping manner from code words to layers based on the TRP may be used. That is, two code words are used. On the other hand, as shown at a right side of FIG. 17, it is assumed that channel quality of the TRP3 to the UE slightly differs from channel quality of the TRP4 to the UE. In this case, for example, the UE may select a mapping manner using one code word.

With the above embodiments, a problem that it is difficult for one transmission coding scheme to match multiple different channel cases due to the possibility that one code word may be transmitted across the TRPs can be solved with only a small signaling consumption.

In the above description of the apparatus according to the embodiment of the present invention, some methods and processes are also disclosed. Next, a method according to an embodiment of the present invention is described without repeating the details described above.

Figure 2:
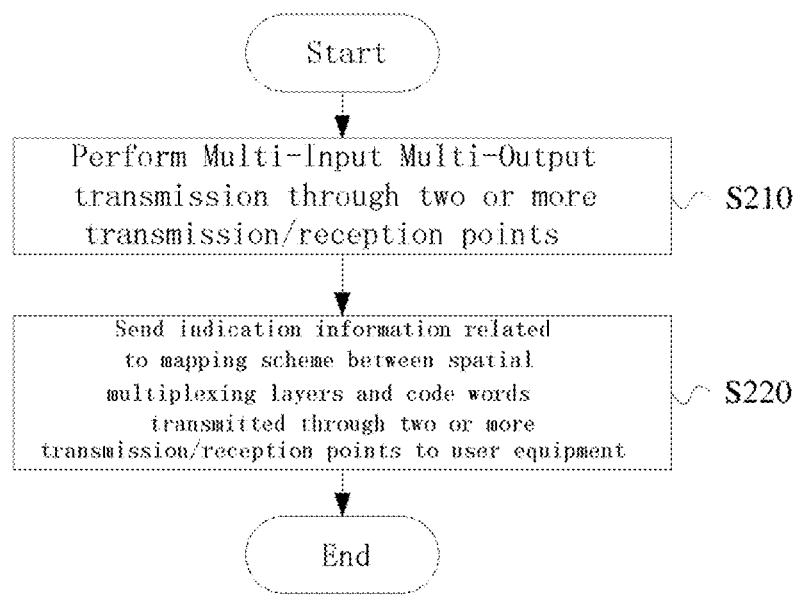
FIG. 2 is a flowchart showing a process example of a wireless communication method for base station side according to an embodiment of the present invention.

As shown in FIG. 2, a wireless communication method for base station side according to an embodiment includes the following steps:

S210 of performing a Multi-Input Multi-Output transmission through two or more transmission/reception points; and S220 of sending indication information to a user equipment. The indication information is related to a mapping scheme between spatial multiplexing layers and code words transmitted through the two or more transmission/reception points.

In addition, an electronic apparatus and a wireless communication method for user equipment side are further provided according to embodiments of the present invention.

Figure 3:
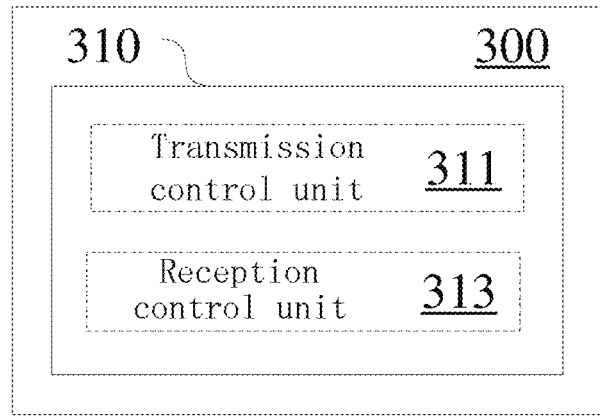
FIG. 3 is a block diagram showing a configuration example of an electronic apparatus for user equipment side according to an embodiment of the present invention.

As shown in FIG. 3, an electronic apparatus 300 for a user equipment according to an embodiment includes a processing circuitry 310. The processing circuitry 310 includes a transmission control unit 311 and a reception control unit 313.

The transmission control unit 311 is configured to perform control to receive a Multi-Input Multi-Output transmission performed by a base station through two or more transmission/reception points.

The reception control unit 313 is configured to perform control to receive indication information from the base station. The indication information is related to a mapping scheme between spatial multiplexing layers and code words transmitted through the two or more transmission/reception points.

Figure 4:
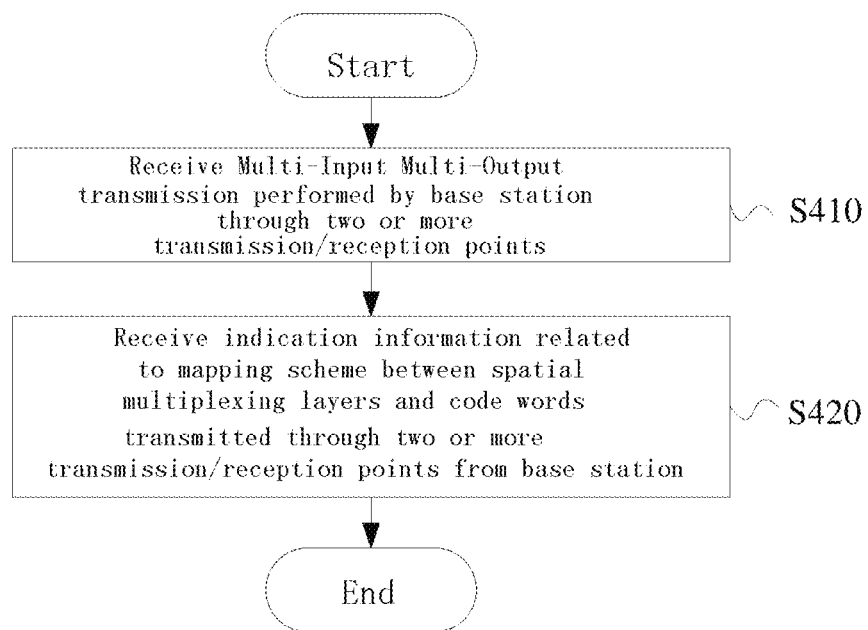
FIG. 4 is a flowchart showing a process example of a wireless communication method for user equipment side according to an embodiment of the present invention.

As shown in FIG. 4, a wireless communication method for a user equipment according to an embodiment includes the following steps:

S410 of receiving a Multi-Input Multi-Output transmission performed by a base station through two or more transmission/reception points; and S420 of receiving indication information from the base station. The indication information is related to a mapping scheme between spatial multiplexing layers and code words transmitted through the two or more transmission/reception points.

In addition, as mentioned above, the mapping scheme between the spatial multiplexing layers and the code words may be determined at the UE side, for example, based on the downlink channel state. Next, an embodiment in which a mapping scheme is determined at the user equipment side will be described.

Figure 5:
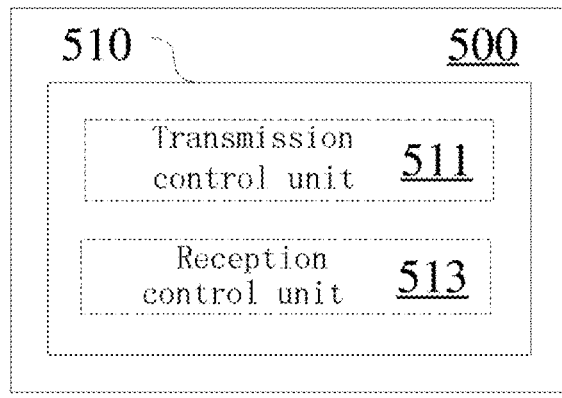
FIG. 5 is a block diagram showing a configuration example of an electronic apparatus for base station side according to an embodiment of the present invention.

As shown in FIG. 5, an electronic apparatus 500 for base station side according to an embodiment includes a processing circuitry 510. The processing circuitry 510 includes a transmission control unit 511 and a reception control unit 513.

The transmission control unit 511 is configured to perform control to perform a Multi-Input Multi-Output transmission through two or more transmission/reception points.

The reception control unit 513 is configured to perform control to receive indication information from a user equipment. The indication information is related to a mapping scheme between spatial multiplexing layers and code words transmitted through the two or more transmission/reception points.

Figure 6:
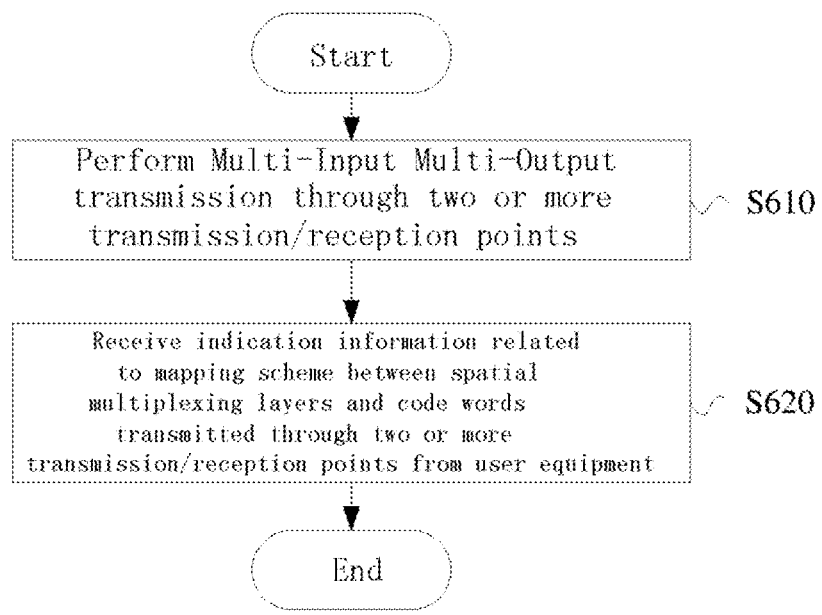
FIG. 6 is a flowchart showing a process example of a wireless communication method for base station side according to an embodiment of the present invention.

As shown in FIG. 6, a wireless communication method for base station side according to an embodiment includes the following steps:

S610 of performing a Multi-Input Multi-Output transmission through two or more transmission/reception points; and S620 of receiving indication information from a user equipment. The indication information is related to a mapping scheme between spatial multiplexing layers and code words transmitted through the two or more transmission/reception points.

Figure 7:
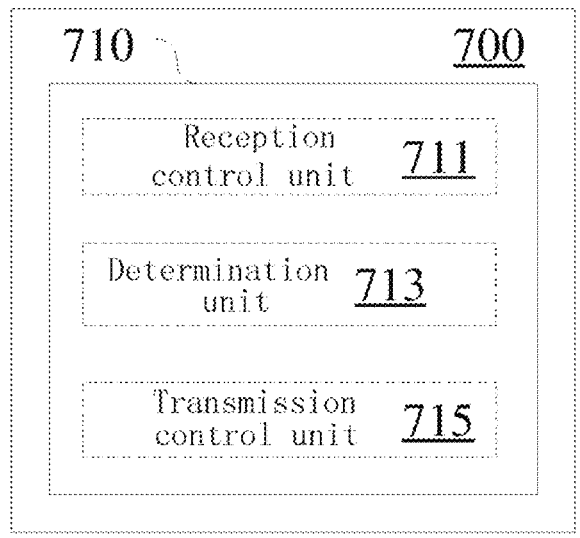
FIG. 7 is a block diagram showing a configuration example of an electronic apparatus for user equipment side according to an embodiment of the present invention.

FIG. 7 shows an electronic apparatus for user equipment side according to an embodiment. As shown in FIG. 7, an electronic apparatus 700 includes a processing circuitry 710. The processing circuitry 710 includes a reception control unit 711, a determination unit 713, and a transmission control unit 715.

The reception control unit 711 is configured to perform control to receive a Multi-Input Multi-Output transmission performed by a base station through two or more transmission/reception points.

The determination unit 713 is configured to determine, based on a downlink channel state of the Multi-Input Multi-Output transmission, a mapping scheme between spatial multiplexing layers and code words transmitted through the two or more transmission/reception points.

According to an embodiment, the mapping scheme is determined as a mapping scheme in which spatial multiplexing layers with similar channel quality are mapped to a same code word.

In addition, the spatial multiplexing layers mapped to a same code word may include spatial multiplexing layers of different transmission/reception points.

The transmission control unit 715 is configured to perform control to send indication information related to the mapping scheme to the base station.

According to an embodiment, the indication information may include a rank index for each of the two or more transmission/reception points.

In addition, the indication information may further include a bitmap, wherein, a length of the bitmap is a sum of rank indices of the two or more transmission/reception points.

In the embodiment that the mapping scheme is determined at the UE side, the base station may configure multiple TRPs/antenna plates for the UE, and the UE determines a mapping manner from the code words to the layers by itself.

Specifically, for example, the UE may report information of 1 bit to the base station to indicate that a predetermined mapping manner between the code words and the layers is used. For example, "0" indicates that the predetermined mapping manner is not used, while "1" indicates that the predetermined mapping manner is used.

If the mapping manner determined by the UE itself is used, for example, the UE may calculate feedback information such as the CQI, and the like, based on the mapping manner selected by itself.

It should be noted that, when selecting layers to be mapped to a same code word, the UE may not necessarily select layers from a same TRP. Instead, the UE may select layers with similar channel quality such as the SINR.

Figure 19:
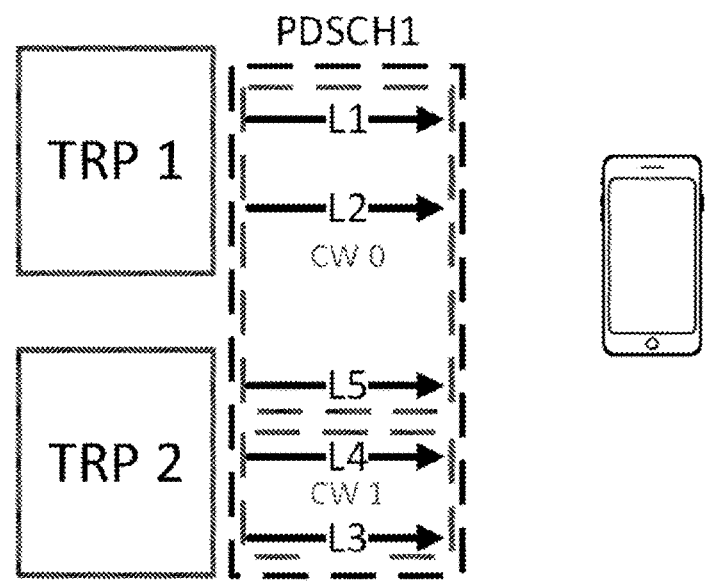
FIG. 19 is a schematic diagram for explaining a mapping relationship from code words of multiple TRPs to layers.

As shown in FIG. 19, layers L1 and L2 of a TRP1 have a SINR value similar to that of a layer L5 of a TRP2. Therefore, the UE may make the layers L1, L2, and L5 form one code word CW0, and make layers L3 and L4 form another code word CW1.

Further, the UE may report the mapping relationship between the code words and the layers that is selected by the UE to the base station.

As an example, the UE may feed back two RIs to the base station. With reference to the example shown in FIG. 19, for example, an RI_1 for a TRP1 is 2 and an RI_2 for a TRP2 is 3. In addition, the UE may report a bitmap with a length of RI_1+RI_2. The bitmap is "00110" in this example, where three "0" represent that three layers assigned to the CW0 are L1, L2, and L5, and two "1" represent that layers assigned to the CW1 are L3 and L4.

For example, the UE may first determine one to two code words and an RI (number of layers) of each code word based on the selected mapping manner from code words to layers. Then, based on measured intensity S of a useful signal of each code word, interference I_inter outside the cell, and interference I_inner between code words (in a case of two code words), the UE calculates an SINR from SINR=S/(I_inter+I_inner+N noise) and maps the calculated SINR to CQIs. For example, a specific mapping from the SINR to the CQIs may be as follows: an SINR interval of −5 dB to 20 dB may be equally divided into 14 subintervals, an SINR subinterval less than −5 dB is mapped to CQI 0, and an SINR subinterval greater than 20 dB is mapped to CQI 15, that is to say, the SINR is mapped to 16 CQIs in total. Depending on a link-level or system-level simulation result, a non-uniform mapping manner may be used as well.

Figure 8:
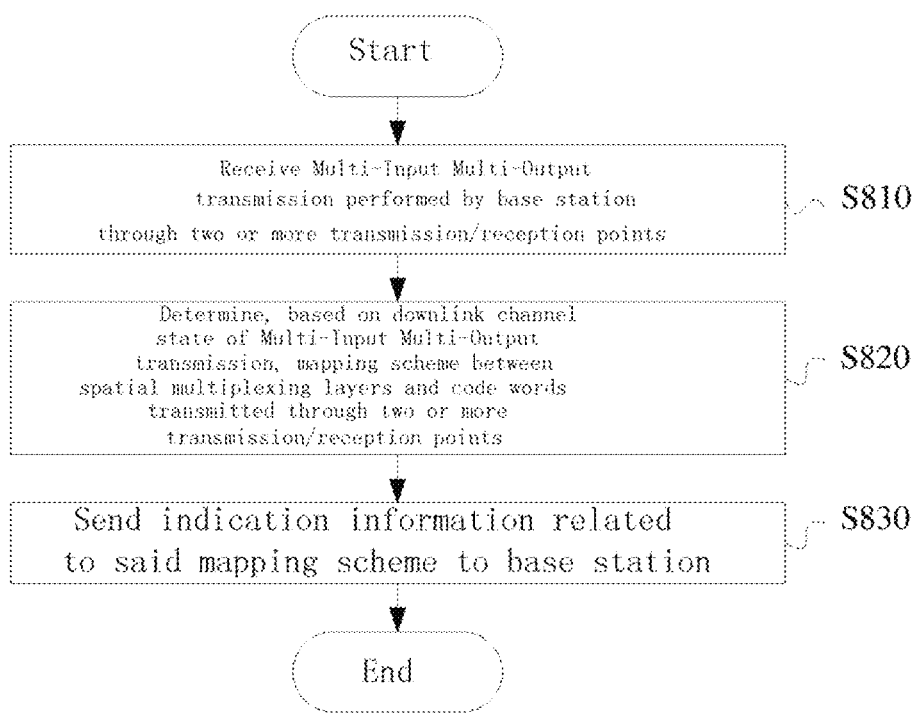
FIG. 8 is a flowchart showing a process example of a wireless communication method for user equipment side according to an embodiment of the present invention.
Figure 9:
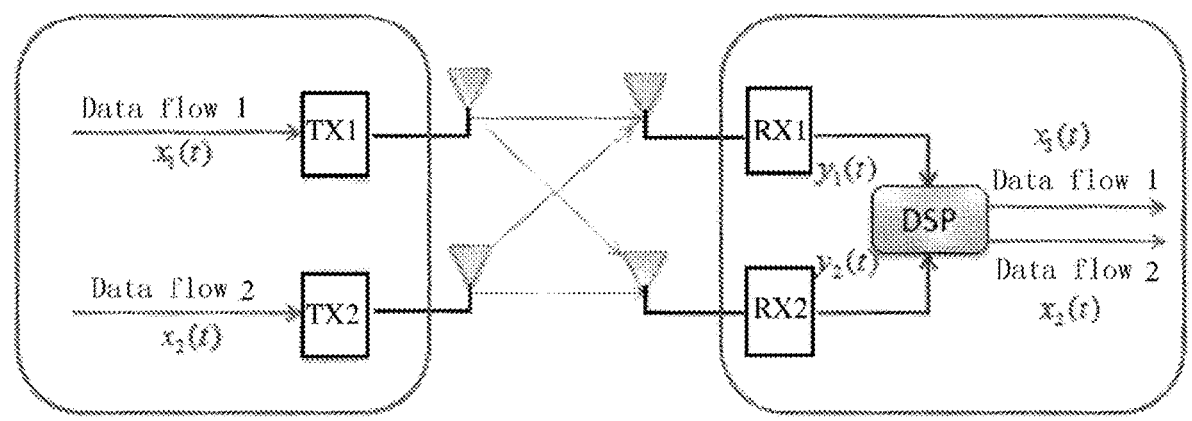
FIG. 9 is a schematic diagram for explaining a concept of a spatial multiplexing layer.
Figure 10:
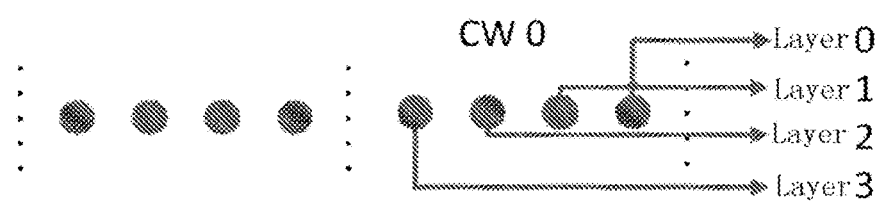
FIG. 10 is a schematic diagram for explaining mapping from modulation symbols of a code word to layers.

FIG. 8 shows a wireless communication method for user equipment side according to an embodiment. The method includes the following steps:

S810 of receiving a Multi-Input Multi-Output transmission performed by a base station through two or more transmission/reception points;

S820 of determining a mapping scheme between spatial multiplexing layers and code words transmitted through the two or more transmission/reception points based on a downlink channel state of the Multi-Input Multi-Output transmission; and S830 of sending indication information related to the mapping scheme to the base station.

In addition, a computer readable medium is further provided according to an embodiment of the present invention. The computer readable medium includes executable instructions which, when being executed by an information processing device, cause the information processing device to implement the methods according to the above embodiments.

A wireless communication device for user equipment side and a wireless communication device for base station side are further provided according to embodiments of the present invention. The above wireless communication device includes a transceiver apparatus and a processor described in combination with the above embodiments.

Figure 24:
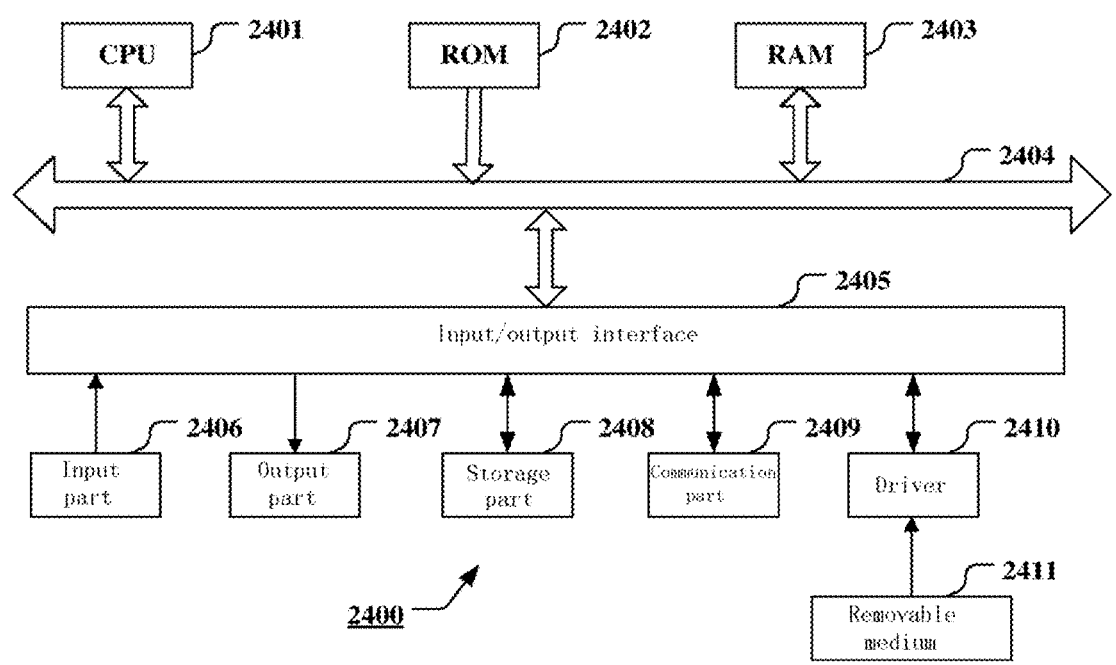
FIG. 24 is a block diagram showing an exemplary structure of a computer that implements methods and devices according to the present disclosure.

As an example, the respective steps of the above methods and the respective constituent modules and/or units of the above apparatuses may be implemented as software, firmware, hardware or a combination thereof. In the case of implementation by software or firmware, a program constituting the software for implementing the above methods is installed from a storage medium or a network to a computer having a purpose-specific hardware structure (e.g., the universal computer 2400 as shown in FIG. 24). The computer, when installed with various programs, is capable of executing various functions and the like.

In FIG. 24, a Central Processing Unit (i.e., CPU) 2401 executes various processing according to a program stored in a Read-Only Memory (ROM) 2402 or a program loaded from a storage part 2408 to a Random Access Memory (RAM) 2403. In the RAM 2403, data needed when the CPU 2401 executes various processing and the like is also stored as needed. The CPU 2401, the ROM 2402 and the RAM 2403 are linked to each other via a bus 2404. An input/output interface 2405 is also linked to the bus 2404.

The following components are linked to the input/output interface 2405: an input part 2406 (including a keyboard, a mouse and the like), an output part 2407 (including a display, such as a Cathode Ray Tube (CRT), a Liquid Crystal Display (LCD) and the like, as well as a speaker and the like), the storage part 2408 (including a hard disc and the like), and a communication part 2409 (including a network interface card such as an LAN card, a modem and the like). The communication part 2409 executes communication processing via a network such as the Internet. As needed, a driver 2410 may also be linked to the input/output interface 2405. A removable medium 2411 such as a magnetic disc, an optical disc, a magnetic optical disc, a semiconductor memory and the like is installed on the driver 2410 as needed, such that a computer program read therefrom is installed in the storage part 2408 as needed.

In a case where the above series of processing is implemented by software, a program constituting the software is installed from a network such as the Internet or a storage medium such as the removable medium 2411.

Those skilled in the art should appreciate that such a storage medium is not limited to the removable medium 2411 having stored therein a program and distributed separately from a device to provide the program to a user as shown in FIG. 24. Examples of the removable medium 2411 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Alternatively, the storage medium may be hard discs and the like included in the ROM 2402 and the storage part 2408, in which programs are stored, and which are distributed concurrently with the device including them to users.

Embodiments of the present invention further relate to a program product having stored therein machine readable instruction codes that, when read and executed by a machine, can execute the above methods according to the embodiments of the present invention.

Accordingly, a storage medium for carrying the above program product having stored therein machine readable instruction codes is also included in the disclosure of the present invention. The storage medium includes but is not limited to a floppy disc, an optical disc, a magnetic optical disc, a memory card, a memory stick and the like.

Embodiments of the present application further relate to an electronic device. The electronic device, when used for base station side, may be realized as any type of Evolved node B (eNB), such as macro eNB and small eNB. The small eNB may be an eNB of a cell with smaller coverage than a macro cell, such as a pico eNB, a micro eNB and a home (femto) eNB. Alternatively, the electronic device may be realized as any other type of base station, such as NodeB and Base Transceiver Station (BTS). Preferably, the electronic device may be realized as a gNB in a 5G system. The electronic device may include: a main body (also referred to as a base station equipment) configured to control wireless communication; and one or more Remote Radio Heads (RRHs) disposed at a different place from the main body. In addition, all the various types of terminals which will be described below can operate as base stations by temporarily or semi-persistently executing base station functions.

The electronic device, when used for user equipment side, may be realized as a mobile terminal (such as a smartphone, a tablet Personal Computer (PC), a notebook PC, a portable game terminal, a portable/dongle type mobile router and a digital camera) or an in-vehicle terminal (such as an automobile navigation equipment). In addition, the electronic device may be a wireless communication module (such as an integrated circuit module including a single or more dies) installed on each of the above terminals.

[Application Example with Regard to Terminal Equipment]

Figure 25:
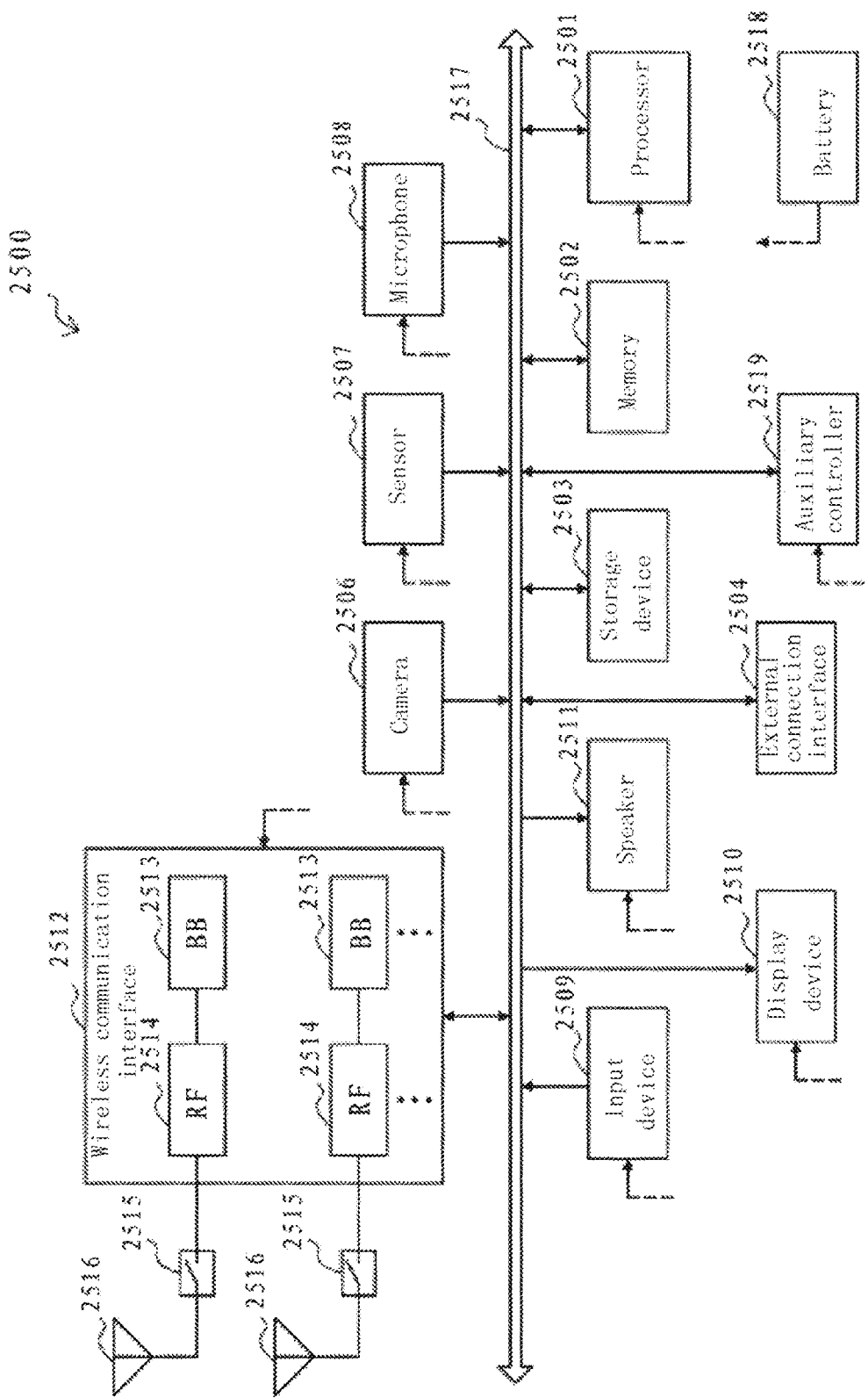
FIG. 25 is a block diagram showing an example of an exemplary configuration of a smartphone to which the technology according to the present disclosure may be applied.

FIG. 25 is a block diagram showing an example of a schematic configuration of a smartphone 2500 to which the technology of the present disclosure may be applied. The smartphone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a System on Chip (SoC), and control functions of an application layer and additional layers of the smartphone 2500. The memory 2502 includes an RAM and an ROM, and stores a program that is executed by the processor 2501 and data. The storage device 2503 may include a storage medium, such as a semiconductor memory and a hard disc. The external connection interface 2504 is an interface for connecting an external device (such as a memory card and a Universal Serial Bus (USB) device) to the smartphone 2500.

The camera 2506 includes an image sensor (such as a Charge Coupled Device (CCD) and a Complementary Metal Oxide Semiconductor (CMOS)), and generates a captured image. The sensor 2507 may include a group of sensors, such as a measurement sensor, a gyro sensor, a geomagnetic sensor and an acceleration sensor. The microphone 2508 converts sound inputted to the smartphone 2500 to an audio signal. The input device 2509 includes for example a touch sensor configured to detect a touch on a screen of the display device 2510, a keypad, a keyboard, buttons or switches, and receives an operation or information inputted from a user. The display device 2510 includes a screen (such as a Liquid Crystal Display (LCD) and an Organic Light-Emitting Diode (OLED) display), and displays an output image of the smartphone 2500. The speaker 2511 converts the audio signal outputted from the smartphone 2500 to sound.

The wireless communication interface 2512 supports any cellular communication scheme (such as LTE and LTE-Advanced), and executes wireless communication. The wireless communication interface 2512 generally may include for example a base band (BB) processor 2513 and a radio frequency (RF) circuit 2514. The BB processor 2513 may execute for example coding/decoding, modulation/demodulation and multiplexing/demultiplexing, and execute various types of signal processing for wireless communication. Meanwhile, the RF circuit 2514 may include for example a frequency mixer, a filter and an amplifier, and transmit and receive a wireless signal via the antennas 2516. The wireless communication interface 2512 may be a chip module on which a BB processor 2513 and an RF circuit 2514 are integrated. As shown in FIG. 25, the wireless communication interface 2512 may include a plurality of BB processors 2513 and a plurality of RF circuits 2514. Although FIG. 25 shows an example in which the wireless communication interface 2512 includes a plurality of BB processors 2513 and a plurality of RF circuits 2514, the wireless communication interface 2512 may include a single BB processor 2513 or a single RF circuit 2514 as well.

In addition, besides the cellular communication schemes, the wireless communication interface 2512 may support other types of wireless communication schemes, such as a short range wireless communication scheme, a near field communication scheme and a wireless Local Area Network (LAN) scheme. In this case, the wireless communication interface 2512 may include a BB processor 2513 and an RF circuit 2514 for each wireless communication scheme.

Each of the antenna switches 2515 switches connection destinations of the antennas 2516 among a plurality of circuits (for example, circuits for different wireless communication schemes) included in the wireless communication interface 2512.

Each of the antennas 2516 includes a single or more antenna elements (such as a plurality of antenna elements included in a MIMO antenna), and is used for transmitting and receiving a wireless signal by the wireless communication interface 2512. As shown in FIG. 25, the smartphone 2500 may include a plurality of antennas 2516. Although FIG. 25 shows an example in which the smartphone 2500 includes a plurality of antennas 2516, the smartphone 2500 may include a single antenna 2516 as well.

In addition, the smartphone 2500 may include an antenna 2516 for each wireless communication scheme. In this case, the antenna switch 2515 may be omitted from the configuration of the smartphone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512 and the auxiliary controller 2519 to each other. The battery 2518 supplies electric power to the respective blocks of the smartphone 2500 as shown in FIG. 25 via feeder lines which are partially shown as dashed lines in the figure. The auxiliary controller 2519 manipulates a minimum necessary function of the smartphone 2500, for example, in a sleep mode.

In the smartphone 2500 as shown in FIG. 25, the transceiver apparatus of the wireless communication device at user equipment side according to the embodiment of the present invention may be realized by the wireless communication interface 2512. At least part of the functions of the processing circuitry and/or respective units of the electronic apparatus or wireless communication device at user equipment side according to the embodiment of the present invention may also be implemented by the processor 2501 or the auxiliary controller 2519. For example, a part of the function of the processor 2501 may be implemented by the auxiliary controller 2519 so as to reduce power consumption of the battery 2518. Further, the processor 2501 or the auxiliary controller 2519 may perform at least a part of the functions of the processing circuitry and/or respective units of the electronic apparatus or wireless communication device at user equipment side according to the embodiment of the present invention by executing the program stored in the memory 2502 or the storage device 2503.

[Application Example with Regard to Base Station]

Figure 23:
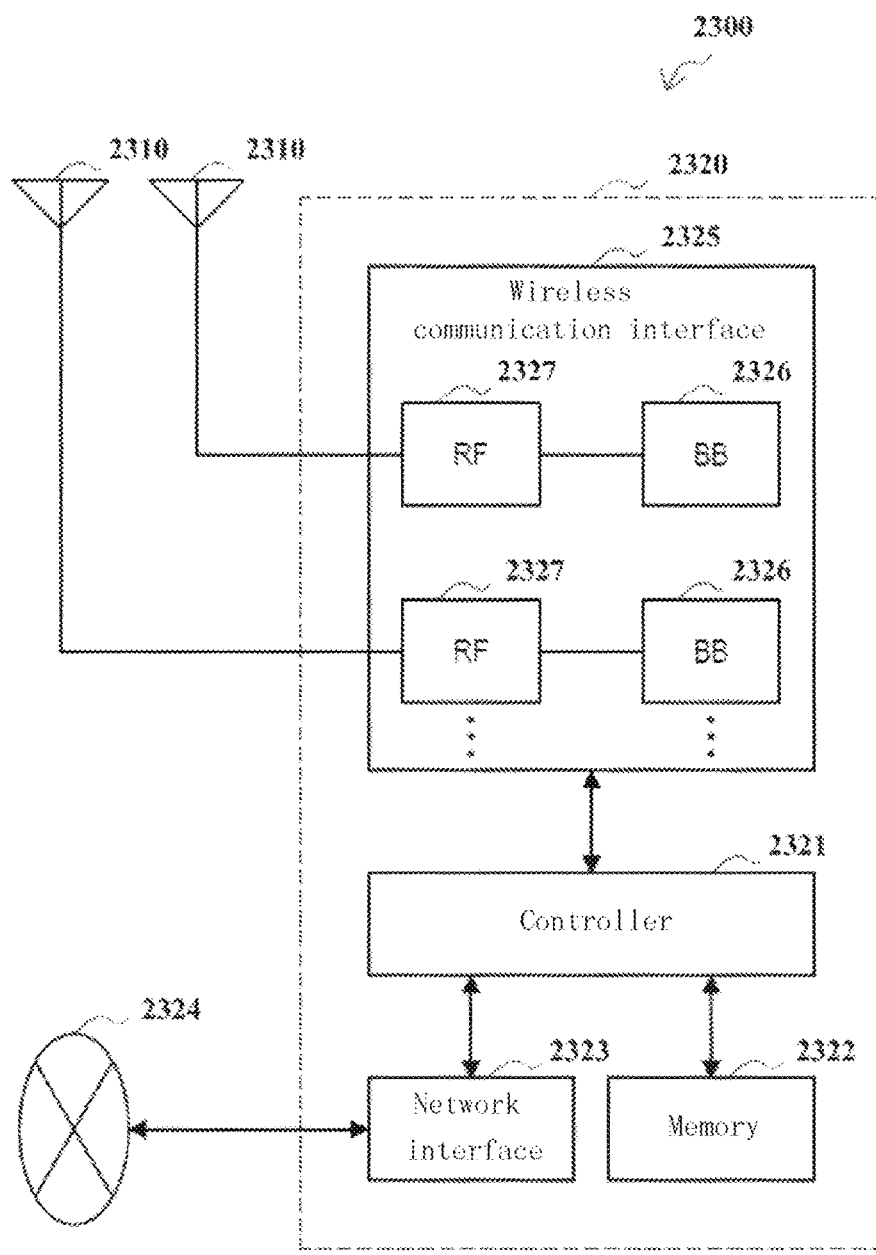
FIG. 23 is a block diagram showing an exemplary configuration of a gNB (a base station in a 5G system) to which technology according to the present disclosure may be applied.

FIG. 23 is a block diagram showing an example of a schematic configuration of an gNB to which the technology of the present disclosure may be applied. The gNB 2300 includes a plurality of antennas 2310 and a base station equipment 2320. The base station equipment 2320 and each antenna 2310 may be connected with each other via a radio frequency (RF) cable.

Each of the antennas 2310 includes a single or more antenna elements (such as a plurality of antenna elements included in a Multi-Input Multi-Output (MIMO) antenna), and is used for sending and receiving a wireless signal by the base station equipment 2320. As shown in FIG. 23, the gNB 2300 may include a plurality of antennas 2310. For example, the plurality of antennas 2310 may be compatible with a plurality of frequency bands used by the gNB 2300.

The base station equipment 2320 includes a controller 2321, a memory 2322, a network interface 2323, and a wireless communication interface 2325.

The controller 2321 may be for example a CPU or a DSP, and manipulate various functions of a higher layer of the base station equipment 2320. For example, the controller 2321 generates data packets according to data in a signal processed by the wireless communication interface 2325, and transfers the generated packets via the network interface 2323. The controller 2321 may bundle data from a plurality of baseband processors to generate bundled packets, and transfer the generated bundled packets. The controller 2321 may have a logic function of executing control, such as radio resource control, radio bearer control, mobility management, admission control, and scheduling. The control may be executed in combination with a nearby gNB or a core network node. The memory 2322 includes an RAM and an ROM, and stores a program that is executed by the controller 2321 and various types of control data (such as a terminal list, transmission power data, and scheduling data).

The network interface 2323 is a communication interface for connecting the base station equipment 2320 to a core network 2324. The controller 2321 may communicate with a core network node or another gNB via the network interface 2323. In that case, the gNB 2300 and the core network node or the other gNB may be connected to each other via a logic interface (such as S1 interface and X2 interface). The network interface 2323 may also be a wired communication interface, or a wireless communication interface for radio backhaul. If the network interface 2323 is a wireless communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-Advanced), and provides a wireless connection to a terminal located in a cell of the gNB 2300 via the antennas 2310. The wireless communication interface 2325 generally may include for example a BB processor 2326 and an RF circuit 2327. The BB processor 2326 may execute for example coding/decoding, modulation/demodulation and multiplexing/demultiplexing, and execute various types of signal processing of a layer (for example L1, Medium Access Control (MAC), Radio Link Control (RLC) and Packet Data Convergence Protocol (PDCP)). Instead of the controller 2321, the BB processor 2326 may have a part or all of the above logic functions. The BB processor 2326 may be a memory which stores a communication control program, or a module including a processor configured to execute a program and a related circuit. The function of the BB processor 2326 may be changed through program updating. The module may be a card or blade inserted in a slot of the base station equipment 2320. Alternatively, the module may also be a chip installed on the card or blade. Meanwhile, the RF circuit 2327 may include for example a frequency mixer, a filter and an amplifier, and transmit and receive a wireless signal via the antennas 2310.

As shown in FIG. 23, the wireless communication interface 2325 may include a plurality of BB processors 2326. For example, the plurality of BB processors 2326 may be compatible with a plurality of frequency bands used by the gNB 2300. As shown in FIG. 23, the wireless communication interface 2325 may include a plurality of RF circuits 2327. For example, the plurality of RF circuits 2327 may be compatible with a plurality of antenna elements. Although FIG. 23 shows an example in which the wireless communication interface 2325 includes a plurality of BB processors 2326 and a plurality of RF circuits 2327, the wireless communication interface 2325 may include a single BB processor 2326 or a single RF circuit 2327 as well.

In the gNB 2300 as shown in FIG. 23, the transceiver apparatus of the wireless communication device at base station side according to the embodiment of the present invention may be realized by the wireless communication interface 2325. At least part of the functions of the processing circuitry and/or respective units of the electronic apparatus or the wireless communication device at base station side according to the embodiment of the present invention may also be implemented by the controller 2321. For example, the controller 2321 may perform at least a part of the functions of the processing circuitry and/or respective units of the electronic apparatus or the wireless communication device at base station side according to the embodiment of the present invention by executing a program stored in the memory 2322.

In the foregoing description of the detailed embodiments of the present invention, features described and/or shown with respect to one embodiment may be used in one or more other embodiments in an identical or similar manner, be combined with features in other embodiments, or substitute features in other embodiments.

It should be emphasized that, the term "comprising/including" used herein refers to existence of features, elements, steps or assemblies, but does not exclude existence or addition of one or more other features, elements, steps or assemblies.

In the above embodiments and examples, reference numerals composed of number are used to represent the respective steps and/or units. Those ordinarily skilled in the art should understand that, these reference numerals aim only to facilitate description and plotting, but do not represent an order thereof or any other limitation.

Further, the methods of the present invention are not limited to be executed in the temporal order described in the specification, but may also be executed sequentially in another temporal order, in parallel or independently. Therefore, the execution order of the methods described in the present specification does not limit the technical scope of the present invention.

Although the present invention has been disclosed above by the description of the detailed embodiments of the present invention, it should be understood that all the above embodiments and examples are exemplary but not limitative. Those skilled in the art could design various modifications, improvements or equivalents with regard to the present invention within the spirit and scope of the appended claims. These modifications, improvements or equivalents should also be construed as being included within the scope of protection of the present invention.

The invention claimed is:

1. An electronic apparatus for user equipment side, comprising a processing circuitry, the processing circuitry being configured to:
   perform control to receive a Multi-Input Multi-Output transmission performed by a base station through two or more transmission/reception points;
   determine, based on a downlink channel state of the Multi-Input Multi-Output transmission, a mapping scheme between spatial multiplexing layers and code words transmitted through the two or more transmission/reception points; and
   perform control to send indication information related to the mapping scheme to the base station, wherein the indication information comprises: a rank index for each of the two or more transmission/reception points, and the indication information further comprises a bitmap, and wherein a length of the bitmap is a sum of rank indices of the two or more transmission/reception points.

2. An electronic apparatus for user equipment side, comprising a processing circuitry, the processing circuitry being configured to:
   perform control to receive a Multi-Input Multi-Output transmission performed by a base station through two or more transmission/reception points;
   determine, based on a downlink channel state of the Multi-Input Multi-Output transmission, a mapping scheme between spatial multiplexing layers and code words transmitted through the two or more transmission/reception points; and
   perform control to send indication information related to the mapping scheme to the base station, wherein
   the mapping scheme is determined as a mapping scheme in which spatial multiplexing layers with similar channel quality are mapped to a same code word,
   the indication information comprises: a rank index for each of the two or more transmission/reception points, and
   the indication information further comprises a bitmap, and wherein a length of the bitmap is a sum of rank indices of the two or more transmission/reception points.

3. An electronic apparatus for user equipment side, comprising a processing circuitry, the processing circuitry being configured to:
   perform control to receive a Multi-Input Multi-Output transmission performed by a base station through two or more transmission/reception points;
   determine, based on a downlink channel state of the Multi-Input Multi-Output transmission, a mapping scheme between spatial multiplexing layers and code words transmitted through the two or more transmission/reception points; and
   perform control to send indication information related to the mapping scheme to the base station, wherein
   the spatial multiplexing layers mapped to the same code word comprise spatial multiplexing layers of different transmission/reception points,
   the indication information comprises: a rank index for each of the two or more transmission/reception points, and
   the indication information further comprises a bitmap, and wherein a length of the bitmap is a sum of rank indices of the two or more transmission/reception points.

* * * * *